United States Patent
Aberle et al.

(10) Patent No.: US 6,777,909 B1
(45) Date of Patent: Aug. 17, 2004

(54) DEVICE FOR GENERATING ELECTRIC ENERGY IN A MOTOR VEHICLE BY MEANS OF A FUEL CELL AND METHOD FOR OPERATING SUCH A DEVICE

(75) Inventors: Markus Aberle, Dettingen (DE); Josef Sonntag, Kirchhein (DE)

(73) Assignee: Ballard Power System AG, Kirchheim-Nabern (DE)

( * ) Notice: Subject to any disclaimer, the term of this patent is extended or adjusted under 35 U.S.C. 154(b) by 77 days.

(21) Appl. No.: 10/129,651

(22) PCT Filed: Sep. 21, 2000

(86) PCT No.: PCT/EP00/09233
§ 371 (c)(1),
(2), (4) Date: Sep. 17, 2002

(87) PCT Pub. No.: WO01/34424
PCT Pub. Date: May 17, 2001

(30) Foreign Application Priority Data

Nov. 11, 1999 (DE) .......................................... 199 54 306

(51) Int. Cl.⁷ .................................................. H02J 7/00
(52) U.S. Cl. ....................................... 320/104; 320/103
(58) Field of Search ................................. 320/104, 103, 320/116, 139, 132; 361/86, 87

(56) References Cited

U.S. PATENT DOCUMENTS

| | | | |
|---|---|---|---|
| 5,166,584 A | 11/1992 | Fukino et al. | 318/139 |
| 5,625,272 A | 4/1997 | Takahashi | 320/6 |
| 6,255,008 B1 * | 7/2001 | Iwase | 429/9 |
| 6,388,421 B2 * | 5/2002 | Abe | 320/104 |

FOREIGN PATENT DOCUMENTS

| | | |
|---|---|---|
| DE | 43 22 767 A1 | 7/1993 |
| DE | 196 17 548 A1 | 5/1996 |
| DE | 197 31 250 A1 | 7/1997 |
| DE | 198 10 468 A1 | 3/1998 |
| FR | 2 771 863 | 12/1997 |

* cited by examiner

*Primary Examiner*—Lawrence Luk
(74) *Attorney, Agent, or Firm*—Seed IP Law Group PLLC

(57) ABSTRACT

In a device for generating electrical power with the fuel cell in a vehicle, a temporary power storage supplies power for a battery start, is charged when the fuel cell is operating, outputs power to connected loads of the fuel cell power system when there is an increased power demand, and absorbs power during braking.

15 Claims, 2 Drawing Sheets

DEVICE FOR GENERATING ELECTRIC ENERGY IN A MOTOR VEHICLE BY MEANS OF A FUEL CELL AND METHOD FOR OPERATING SUCH A DEVICE

This application claims the priority of German patent document 199 54 306.2, filed 11 Nov. 1999 (11.11.1999) (PCT International Application No. PCT/EP00/09233, filed 21 Sep. 2000 (21.09.2000)), the disclosure of which is expressly incorporated by reference herein.

The invention relates to a method and apparatus for generating electrical power using a fuel cell in a vehicle which has at least one drive motor that can be connected via a converter to the fuel cell, with auxiliary units for the starting phase and the continuous operation after the starting phase also assigned to the fuel cell.

A circuit for supplying electrical power to a power system containing a fuel cell and an accumulator circuit in which the accumulator supplies power during the starting process is disclosed in German patent document DE 198 104 685. In this arrangement, the accumulator circuit is connected to the fuel cell power system via at least one d.c./d.c. converter. The drives of auxiliary units and a compressor for feeding the fuel and/or air are also connected to the fuel cell power system. At the beginning of a starting process, the accumulator supplies power for the auxiliary units. After the starting process (that is, during rated operation), the accumulator is charged via the d.c./d.c. converter.

A method for starting a fuel cell vehicle which is driven by an electrical drive unit fed by fuel cell is also known. The fuel cell vehicle contains a fuel cell to which a fuel (for example, hydrogen) is fed via a line in which a valve and a pressure regulator are arranged. An oxidant (for example, air) is fed to the fuel cell via a further line in which an air filter, an air flow rate meter and a compressor are arranged. To drive the compressor, an electric starter motor which is supplied with 12 V from a starter battery and a further electric motor which is configured for the voltage of the fuel cell are provided. To start the fuel cell, the starter motor is supplied with current by the starter battery. During normal operation, the fuel cell supplies the power required to operate the further electric motor. By means of a potentiometer, the rotational speed of the electric motor (and thus that of the compressor for influencing the oxidant mass flow rate) are set in order to influence the power of the fuel cell (German patent document DE 43 22 767 A1).

At higher drive powers of the vehicle, a correspondingly dimensioned fuel cell is necessary, whose auxiliary and supplementary units also require large powers in the starting phase. When a 12 V starter battery is used, it must therefore output large currents in the starting phase, which is unfavorable for the charge state and also for the service life. The large currents also require large conductor cross sections. In vehicles supplied with electrical power from fuel cells it is desirable to brake them recuperatively. However, a conventional starter battery of 12 V can only partially absorb the fed-back power so that a large amount of the power has to be converted into heat. This degrades the overall efficiency of the fuel cell system.

German patent document DE 197 31 250 A1 discloses a power supply system with a fuel cell stack, storage battery, drive motor and auxiliary machinery, as well as a method for charging the storage battery. The storage battery is connected to the fuel cell stack via a switching contact. The auxiliary machinery is connected to the fuel cell stack and to the storage battery via a d.c./d.c. converter. The drive motor is connected via a switching contact to the fuel cell stack and to the storage battery. A residual charge-sensing device is used to sense residual charge of the storage battery by measuring voltage or current. When the power supply system starts, both the storage battery and the fuel cell stack output electrical power to a load until the heating of the fuel cell stack is terminated.

A device for generating electrical power in a modern motor vehicle must be able to cope with an increasing number of electrical loads, which leads to a rising demand for electrical power. In particular, the number of high-power low-voltage loads is continuously increasing. The vehicle's onboard power system and the power supply or power distribution in the vehicle's onboard power system must be appropriately adapted. Furthermore, it is necessary to ensure readiness to drive even when the primary power source (that is, the fuel cell) fails.

One object of the invention is therefore to provide a device for generating electrical power with a fuel cell and with the auxiliary or supplementary units necessary for the starting and the continuous operation of the fuel cell, such that a storage battery which is present in the vehicle's onboard power system with loads such as lamps is relieved of loading in the starting phase of the fuel cell.

Another object of the invention is to provide a fuel cell system that is composed of the fuel cell and its auxiliary or supplementary units, and has a high level of efficiency in the various operating states of the vehicle, in particular even under partial load of the vehicle drive, during idling or when braking, if appropriate even when the vehicle is at a standstill.

Still another object of the invention is to provide a fuel cell system that can provide power which is necessary for rapid acceleration of the vehicle in addition to the fuel cell power.

Finally, yet another object of the invention is to provide a method for operating such a fuel cell system.

These and other objects and advantages are achieved according to the invention by a fuel cell system of the type described above, in which the converter and auxiliary or supplementary units for the starting and the operation of the fuel cell as well as one end of a bidirectional d.c./d.c. converter can be connected to the electrical outputs of the fuel cell via at least one switching contact. An electrical temporary power store can be connected to the other end of the d.c./d.c. converter via at least one further switching contact; and a controller is provided which controls the release of the power flux via the d.c./d.c. converter and the direction of the power flux as a function of the operating state of the fuel cell and of the temporary power store. The auxiliary units for the starting of the fuel cell can be supplied with power in the starting phase from the temporary power store which has an appropriate capacity. When the switching contact is closed, the power flux then flows between the temporary power store and the d.c./d.c. converter in the direction of the auxiliary units. After the starting phase, the switching contact which is connected downstream of the outputs of the fuel cell is closed. The starting phase is terminated when the fuel cell has reached its predefined operating voltage. This state can be defined by the controller which brings about the closing of the switching contact between the outputs of the fuel cell and the further loads, such as auxiliary units, converters and the d.c./d.c. converter, which are connected to the fuel cell power system.

When the direction of the flow of current in the d.c./d.c. converter is reversed in this switched state, the temporary power store can be charged either by the fuel cell or by the converter in the operating mode of the vehicle. The charging of the temporary power store can be expedient for absorbing a part of the electrical power from the fuel cell if the drive operates in the partial load mode, but in order to achieve a high level of efficiency the fuel cell outputs a higher level of power. In the braking mode, the power which is fed back by the converter of the drive is fed to the temporary power store. If the power which is required by the vehicle drive drops very quickly (for example, when there is a rapid transition from the driving mode into the stationary state), the fuel cell can be adjusted back to a low power level more slowly in order to utilize the combustion gas, the power which is no longer required by the drive being conducted into the temporary power store. The switching contact is, in particular, a component of a battery protection switch, for example power contactor, which is connected to the controller.

In one preferred embodiment, a diode whose polarity is in the forward direction with respect to the polarity of the output voltage given rated operation of the fuel cell is arranged between at least one electrical output of the fuel cell and the switch. The series connection between the switch and diode can be varied as desired. (I.e., the diode can also be arranged downstream of the switch). The diode prevents current from the power system, to which the converter and the d.c./d.c. converter are connected, from being fed into the fuel cell. The diode provides a particularly easy way to avoid the feeding back of power into the fuel cell.

It is expedient if the switching contact is arranged parallel to a series connection of a further switching contact and a resistor, between the one electrical terminal of the temporary power store and an input of the d.c./d.c. converter. In this manner, it is possible for the two switching contacts to be activated by means of the controller and for them to be contactor contacts or relay contacts. The series connection composed of the switch and resistor is connected into the circuit upstream of the switch lying in parallel, in order to keep the switch-on current surge of the d.c./d.c. converter small.

A switch which can be activated by the controller is arranged between the second electrical terminal of the temporary power store and ground, to which in each case a terminal of the d.c./d.c. converter and of the auxiliary drives as well as of the driving converter is connected. This switch, which is provided to protect the temporary power store, is open when the vehicle is stationary.

Both electrical outputs of the fuel cell are preferably connected via one switch each to the power system containing the driving converter, and it is possible for the switches to each be activated independently by the controller.

In particular a lead acid battery, a nickel cadmium battery, a nickel metal hydride battery, a lithium ion battery or a lithium polymer battery is provided as the temporary power store. It is also possible to use a double-layer capacitor, a super capacitor, or an ultra capacitor as the temporary power store. (The service life of such temporary power stores is not dependent on charge cycles.)

It is expedient if sensors, in particular for measuring the voltage and the temperature of the temporary power store, are provided and are connected to the controller as users on a bus. If a databus is already present in the vehicle, the sensors or a unit or assembly which comprises a plurality of sensors for the temporary power store may be connected to this bus.

In a further advantageous embodiment, the bidirectional d.c./d.c. converter and at least one additional bidirectional d.c./d.c. converter (which is connected to the power system fed by the fuel cell and to a vehicle's onboard power system, and whose voltage is lower than the rated voltage of the fuel cell) are arranged in a common housing. The two d.c./d.c. converters can jointly use a supply voltage, for example the voltage of the vehicle's onboard power system, of 12 V and a coolant supply. The communications interface with the bus, for example a CAN bus, may also be common to both converters.

The switches are also preferably arranged between the temporary power store and the d.c./d.c. converter, and the controller is preferably arranged in the housing.

It is expedient if the two d.c./d.c. converters, the cooling means for the converters, the controller with at least one microcontroller, the current-measuring device and the components for monitoring the temporary power store are arranged in a housing to form a single functional unit which has the connections to the other electrical components.

The invention also provides a method for operating a device which includes a fuel cell for generating electrical power in a vehicle which has at least one drive motor connected to the fuel cell via a converter. Auxiliary units are assigned to the fuel cell for the starting phase and for continuous operation after the starting phase; and it is possible to connect the converter, and auxiliary and supplementary units and one end of a bidirectional d.c./d.c. converter to the electrical outputs via at least one switching contact of the fuel cell. A temporary power store, which is connected to a controller, is connected to the other end of the d.c./d.c. converter via at least one further switching contact.

In the method according to the invention, the fuel cell-end voltage and the temporary power store-end voltage are measured. When the temporary power store is charged, a minimum fuel cell-end voltage value, a fuel cell-end setpoint current, a maximum temporary power store-end voltage value and a maximum temporary power store-end current are predefined and monitored. When the minimum fuel cell-end or the maximum temporary power store-end voltage value or the fuel cell-end setpoint current or the power accumulator-end maximum current are reached the charge current of the d.c./d.c. converter is reduced in order to avoid overshooting the minimum voltage value, exceeding the maximum voltage value or exceeding the setpoint current or the maximum current. When the temporary power store is discharged a maximum fuel cell-end voltage value, the fuel cell-end setpoint current, a temporary power store-end minimum voltage value and a temporary power store-end voltage value and a temporary power store-end maximum current value are predefined and monitored; and when the maximum fuel cell-end voltage value or the setpoint current or the power accumulator-end maximum current value is reached the discharge current of the temporary power store is reduced by the d.c./d.c. converter in such a way that the maximum voltage value is not exceeded and the minimum voltage value is not undershot, or the setpoint current or the maximum current exceeded. The method steps described above prevent the fuel cell from being loaded too heavily, (i.e., from having an excessively low output voltage), and prevent the voltage at the loads from being unacceptably high. At the same time, the temporary power store is prevented from dropping to a voltage which adversely affects its operational capability, or from outputting an unacceptably high voltage or from having an unacceptably high voltage applied to it.

In one preferred embodiment there is provision that when the minimum fuel cell-end voltage value (or a higher predefined voltage value) is reached or undershot the d.c./d.c. converter is set to a discharge mode in which the current is fed into the power system connected to the fuel cell. When the maximum fuel cell-end voltage value (or a lower predefined voltage value) is reached or exceeded the d.c./d.c. converter is set to a charge mode in which current from the power system connected to the fuel cell is fed into the temporary power store. The d.c./d.c. converter is inactive when the voltage of the fuel cell lies between the minimum voltage value and the maximum predefined voltage value.

With the automatically executed method which is specified above, the voltage at the loads is kept within the predefined limits independently of the respective operating state of the vehicle (i.e., the drive mode, braking mode or idling mode) to ensure that the loads operate reliably. The temporary power store absorbs, for example, the power which is fed back by the traction drive in the generator mode during braking. When the power demand rises, the temporary power store outputs power to the loads. When load shedding occurs, the temporary power store absorbs current from the fuel cell.

In order to start the device according to the invention which is described above, the temporary power store is first connected, by closing the switch, to the d.c./d.c. converter which makes available the power for the auxiliary or supplementary units which are connected to the power system connected to its output, the fuel cell being activated by the auxiliary or supplementary units. If the fuel cell outputs the predefined voltage, the switch at the output of the fuel cell is closed.

In particular, at the beginning of the starting phase, the switch which is arranged in series with the resistor is connected, after which the switch which is arranged between the other output of the temporary power store and earth is closed. The switch parallel to the switch with the resistor is then closed, after which the switch in series with the resistor is opened. The auxiliary or supplementary units for the fuel cell are then switched on and a switch which is arranged between the fuel cell output and ground is closed. Thereafter the other switch is closed after the no-load voltage of the fuel cell is reached.

When the precharging or starting process is interrupted, the switch between ground and the one output of the temporary power store is opened before the switch that is in series with the resistor is opened.

Other objects, advantages and novel features of the present invention will become apparent from the following detailed description of the invention when considered in conjunction with the accompanying drawings.

DETAILED DESCRIPTION OF THE DRAWINGS

Figure 1:
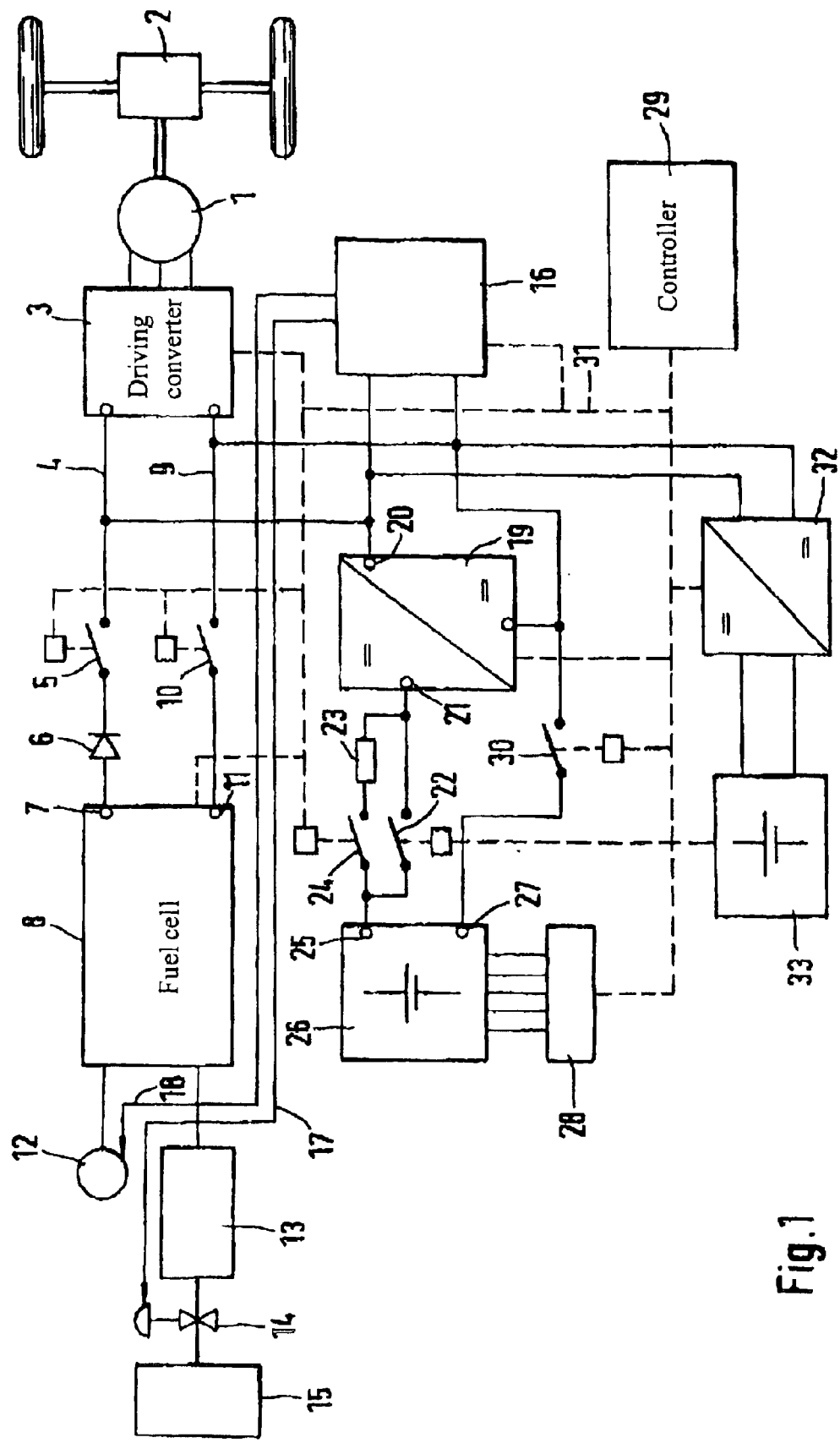
FIG. 1 shows a device according to the invention, for generating electrical power, with a fuel cell and a temporary power store in a mobile device in a block circuit diagram.

A mobile device (not shown in more detail), in particular a vehicle, contains an electric drive motor 1, which also operates as a generator in the braking mode. The electric motor 1 may be a d.c. machine or a three-phase current machine such as a synchronous machine or asynchronous machine. The machine 1 is connected via a differential gearbox 2 using a shaft (not shown in more detail) to drive wheels of a vehicle which are not designated in more detail. Wheel-hub motors can also be used as drive elements.

A driving converter or converter 3 is connected to the terminals of the machine 1. The d.c.-end inputs of the driving converter 3 are connected to a d.c. power system, which is also referred to below as fuel cell intermediate circuit. A line 4 of the d.c. power system which is connected to an input of the driving converter 3 runs to a pole of a switching contact 5, a battery protection switch, for example a power contactor, whose other pole is connected to the cathode of a diode 6 whose anode is connected to the one electrical output 7 of a fuel cell 8, which is, in particular, a PEM fuel cell. A further line 9 of the d.c. power system is connected to the other d.c.-end input of the driving converter 3 and to a pole of a second switching contact 10 whose other pole is connected to the other electrical output 11 of the fuel cell 8. The switching contact 10 is in particular also a contactor contact.

The fuel cell 8 is assigned a series of auxiliary and supplementary units for the starting and operation phases. One of these units is, for example, a compressor 12 which is provided for feeding air to the fuel cell 8. Combustion gas is also fed to the fuel cell from a reforming device 13, which is connected to a fuel tank 15 via a valve 14. Further auxiliary and supplementary units (for example a cooling water pump and the like, which are not shown) may also be present. The switching devices for the auxiliary and supplementary units are designated schematically in the drawing with a block 16, from which lines 17, 18 lead to the auxiliary and supplementary units. The switching units according to block 16 are connected to the d.c. power system or the lines 4, 9 of the d.c. power system. The line 9 is connected here to ground or vehicle ground. A d.c./d.c. converter 19 for bidirectional operation is connected at one end to the d.c. power system; that is, an output/input 20 of the d.c./d.c. converter 19 is connected to the line 4 or to a pole of the switching contact 5.

A second input/output 21 at the other end of the converter is connected to a pole of a switch 22 and to a resistor 23. The resistor 23 is arranged in series with a switch 24 or relay. The other pole of the switch 22 and a pole of the switch 24 are connected to a terminal 25 of a temporary power store 26 which is an accumulator, in particular a lead acid battery, a nickel cadmium battery, a nickel metal hydride battery, a lithium ion battery, a lithium polymer battery or a capacitor, a particular double-layer capacitor, super capacitor or ultra capacitor. The second terminal 27 of the temporary power store 26 is connected via a switch 30 to ground, as is a further terminal, common to the inputs/outputs 20, 21, of the d.c./d.c. converter, and thus also to the line 9.

The d.c./d.c. converter 19 has measuring converters (not shown in more detail internally) for measuring the currents and voltages both at the end facing the fuel cell 8 and at the end facing the temporary power store 26. The temporary store 26 is connected to a data acquisition and transmission unit 28 which is connected to sensors for measuring the voltages and temperatures of the temporary power store 26. The sensors measure, for example, the overall voltage and the temperature of a module of a battery.

A further d.c./d.c. converter 32 is connected by one end to the d.c. power system by means of the lines 4, 9. The other end of the d.c./d.c. converter 32 is connected to an accumulator 33. The accumulator 33 with, for example, 12 V rated voltage is part of a vehicle's onboard power system which contains a series of electrical loads such as windshield wiper motors, lamps, indicator lights, window lifting motors etc. (The vehicle's onboard power system and the loads which are arranged in it are not illustrated in more detail.) The vehicle's onboard power system can be supplied with electrical power from the fuel cell power system via the d.c./d.c. converter 32 in order to charge the accumulator and/or supply the loads. It is also possible to output power from the vehicle's onboard power system into the high voltage power system of the fuel cell.

A controller 29 contains programs for activating the driving converter 3, the auxiliary and supplementary units, the switches 5, 10, 22, 24, 30 for controlling and regulating the d.c./d.c. converter 19 and the d.c./d.c. converter 32, and for processing the measured values of the temperatures and voltages of the temporary power store 26 and the voltages of the vehicle's onboard power system, at the outputs 25, 26 and the inputs/outputs 20, 21 of the d.c./d.c. converter 19 and the terminals of the fuel cell 8 as well as the currents flowing across the d.c./d.c. converters 19 and 32 and the current which is output by the fuel cell 8. The controller is connected, in particular, to a bus 31 to which the switches which are to be activated, the units which are to be controlled, such as the driving converter 3 and the d.c./d.c. converters 19 and 32 and the data acquisition and transmission unit 28 and, for example, further units such as auxiliary and supplementary units are connected as users. The bus is in particular a CAN bus.

The diode 6 prevents damaging reverse currents into the fuel cell.

The switches 22 and 30 have the function, as preventive switches, of disconnecting the temporary power store from the d.c./d.c. converter.

The series resistor 23 together with the switch 24 (for example, a relay) permit the internal capacitors of the d.c./d.c. converter to be precharged in a non-damaging fashion. As the currents flowing across the resistor 23 are low, one relay is sufficient for conducting the current.

The battery data acquisition arrangement 28 senses voltages and temperatures of the battery, for example the overall voltage of a module and the temperature of a module, and transmits the sensed data via the vehicle-internal databus, for example CAN bus.

The d.c./d.c. converter serves as an interface between the temporary power store and the fuel cell d.c. power system by adapting the voltage of the temporary power store to that of the fuel cell d.c. power system.

The auxiliary drives or units are operated during the starting phase from the temporary power store via the d.c./d.c. converter.

The temporary power store 26 can absorb energy which arises during braking. For this purpose, the traction drive becomes a generator and feeds electrical power into the fuel cell d.c. power system. The d.c./d.c. converter 19 feeds from said fuel cell d.c. power system into the temporary power store 26.

When the power demand rises, for example in order to accelerate the vehicle, the d.c./d.c. converter 19 can make available additional power from the temporary power store 26 to the drives in order to provide instantaneously available fuel cell power, thus increasing the dynamics of the current-generating system.

During load shedding, excess power from the fuel cell 8 can be displaced into the temporary power store via the d.c./d.c. converter 19, which is actuated by the vehicle-internal controller 29 via the vehicle-internal bus system, for example CAN.

The d.c./d.c. converter 19 forms the temporary power store system (EZS) with the temporary power store 26 and its peripherals (for example battery management system, battery protection switch etc.):

The fuel cell 8 is started by the following method steps:
1. Closing the switch 24 or relay.
2. Closing the battery protection switch 30.
3. Precharging the internal capacitors of the d.c./d.c. converter via the resistor 23 during a predefinable time period.
4. After the precharging, closing the battery protection switch 22.
5. If the battery protection switch 22 is closed, opening the switch 24 or the relay K1.
6. The d.c./d.c. converter 19 charging the capacitors of the fuel cell intermediate circuit so that the auxiliary drives can start up and be switched on in order to start the fuel cell system.
7. If the fuel cell 8 is sufficiently supplied with combustion gases (for example air from a compressor and hydrogen-rich gas from a reforming process), the fuel cell building up a voltage (after a set time delay).
8. Closing the battery protection switch with the switching contact 10 and measuring the idling voltage of the fuel cell 8.
9. The d.c./d.c. converter 19 raising the voltage of the fuel cell intermediate circuit to the no-load voltage of the fuel cell 8. If the measured no-load voltage of the fuel cell 8 and the voltage of the intermediate circuit correspond, the switching contact 5 is also closed. The starting process is thus terminated and the fuel cell system changes over to rated operation.

Switching off during the precharging (which is associated with the starting process or precedes it) may be desired, and is executed as follows:

If it is necessary to switch off during the starting process (during the step 3), the battery protection switch 30 is first opened, and shortly thereafter the relay 24 is opened.

This has the advantage that the relay 24 does not need to be configured for disconnection of the precharging current. The relay must merely be able to conduct the precharging current and constitute reliable insulation in the opened state.

On the other hand, the switch 30 must also be able to reliably disconnect the circuit in the event of a fault, and must therefore be provided with a device for extinguishing the arc which occurs when d.c. current is switched. The device described above can operate in two operating modes which are referred to below as I mode and automatic mode:

1. I mode

In the I mode, a current from the fuel cell intermediate circuit is predefined for the d.c./d.c. converter 19 and a "charge" or "discharge" signal is additionally predefined. These two signals thus determine the direction of the current. If the "charge" signal is predefined, the temporary power store 26 is charged (i.e., a current flows into the temporary power store 26). In the case of "discharging" a current flows out of the temporary power store 26. As the voltage at the temporary power store 26 is always positive, the direction of the flow of current also corresponds always to the direction of the power flux. In the I mode, during "charging" the following limiting values of the voltage or of the current are predefined:

Ubmin Minimum voltage at fuel cell end

Ib Setpoint current at fuel cell end

Uzmax Maximum voltage at temporary power store end

Iz Maximum current at temporary power store end

If one of these limiting values is approached during the "charging", the d.c./d.c. converter 19 automatically reduces the current. This prevents the fuel cell 8 from being so heavily loaded by the d.c./d.c. converter 19 that its voltage drops below Ubmin.

The permitted voltage is prevented from being exceeded at the temporary power store 26 by the converter 19 itself, in the same way as an acceptable current at the store 26 is prevented from being exceeded.

In the I mode, the following limiting values apply during "discharging" in an analogous way:

Ubmax Maximum voltage at fuel cell end

Ib Setpoint current at fuel cell end

Uzmin Minimum voltage at temporary power store end

Iz Maximum current at temporary power store end

If one of these limiting values is approached during the "charging", the d.c./d.c. converter automatically reduces the current. This prevents the voltage in the fuel cell circuit from exceeding an acceptable value. The voltage is prevented from dropping below the acceptable voltage at the temporary power store (for example a minimum voltage), by the converter 19 itself, in the same way as an acceptable current is prevented from being exceeded at the temporary power store 26.

2. Automatic Mode

In the automatic mode, a voltage window for the fuel cell circuit is predefined for the d.c./d.c. converter 19:

Ubmin Minimum voltage at fuel cell end

Ubmax Maximum voltage at fuel cell end

If the voltage in the fuel cell circuit rises above the limit predefined by Ubmax, the d.c./d.c. converter 19 switches automatically to "charge mode", and therefore feeds current from the fuel cell circuit into the temporary power store 26.

If the voltage in the fuel cell circuit drops below the limit predefined of Ubmin, the d.c./d.c. converter 19 switches automatically to "discharge mode" and feeds current from the temporary power store 26 into the fuel cell circuit and thus supports the voltage in the fuel cell circuit.

The automatic mode is specially configured for operation with a fuel cell system. It is thus possible to automatically compensate voltage dips (for example in the case of load requests) and voltage increases (for example in the case of recuperative braking).

The following limits also apply in the automatic mode

Uzmin Minimum voltage at temporary power store end

Uzmax Maximum voltage at temporary power store end

Ib Setpoint current becomes maximum current at fuel cell end

Iz Maximum current at temporary power store end

If the voltage in the fuel cell circuit is between Ubmin and Ubmax, the d.c./d.c. converter 19 is inactive.

3. Measurement of current

For the regulating process described above, the d.c./d.c. converter 19 has internal measuring transducers for measuring currents and voltages both at the fuel cell end and at the store 26. The measured values in particular the current values, can also be made available to other users on the vehicle-internal bus system, for example in order to determine the coulometric charge state of the temporary power store 26 in a battery management system (BMS). The coulometric charge state of a battery is determined by integrating the current of the store 26.

Both the charge current and the discharge current of the d.c./d.c. converter 19 may be predefined in a desired way (in a quasi-analogous fashion) within predefined limits. In the d.c./d.c. converter 19, the limiting values for the maximum voltage, minimum voltage and maximum current described above are stored in a non-volatile memory, for example a flash Eprom, both for the input end and for the output end. The device can simply be connected to various temporary power storage systems (various storage technologies, for example various battery systems such as lead acid battery, nickel cadmium battery, nickel metal hydride battery, lithium ion battery, lithium polymer battery) and capacitors with various voltage levels, charge characteristics. The charge/discharge strategy is stored by means of software in the vehicle-internal controller 29.

The device described above has the advantage that when there is a rise in power demand, for example in order to accelerate the vehicle, power is made available to the drives from a temporary power store in addition to the instantaneously available fuel cell power. Moreover, it is possible to operate the fuel cell system with high levels of efficiency. In particular, at low powers, a fuel cell system with auxiliary drives has a lower level of efficiency than at its rated configuration point. The overall efficiency of the current-generating system can be increased by operating the fuel cell system at a relatively high power even when there is a low power demand and storing the additionally produced power by means of the temporary power store 26. The stored power can be used for acceleration processes or for operating auxiliary drives, for example when the fuel cell system is started.

If the power of the fuel cell system is to be reduced very quickly, for example because the traffic is congested, combustion gases which can be converted by the fuel cell into electrical current are still available in the fuel cell system. If the current is not required by the drives it is stored in the temporary power store.

In one advantageous embodiment, the d.c./d.c. converter 19 for the temporary power storage system is integrated with the d.c./d.c. converter 32 (which can reduce the voltage of the fuel cell system to the voltage of the vehicle's onboard power system of, for example, 12 V) in a housing 34. The housing 34 is illustrated by dot-dashed lines in FIG. 2.

Integration of two (or even more) converters has the advantage that the internal individual converters can make common use of the supplies, for example 12 V supply voltage and coolant supply (liquid or gaseous) and the communications interface to the vehicle controller, for example via CAN.

The battery protection switches such as 22, 24 and 36 which are necessary for the temporary power store 26 and their actuation electronics for the d.c./d.c. converters 19, 32 can also be accommodated in the common housing 34.

The battery protection switches which are necessary for the temporary power store 26 and their actuation electronics can be integrated into the housing 34, together with the precharging circuit for precharging the internal capacitors.

The emphasis here is not only on the housing 34 but also on the combination of the components for the battery monitoring, interface, battery protection switches, measurement of current, d.c./d.c. converters 19, 32, cooling device, controller 29 with microcontroller and electrical and mechanical connections to form one functional unit.

Figure 2:
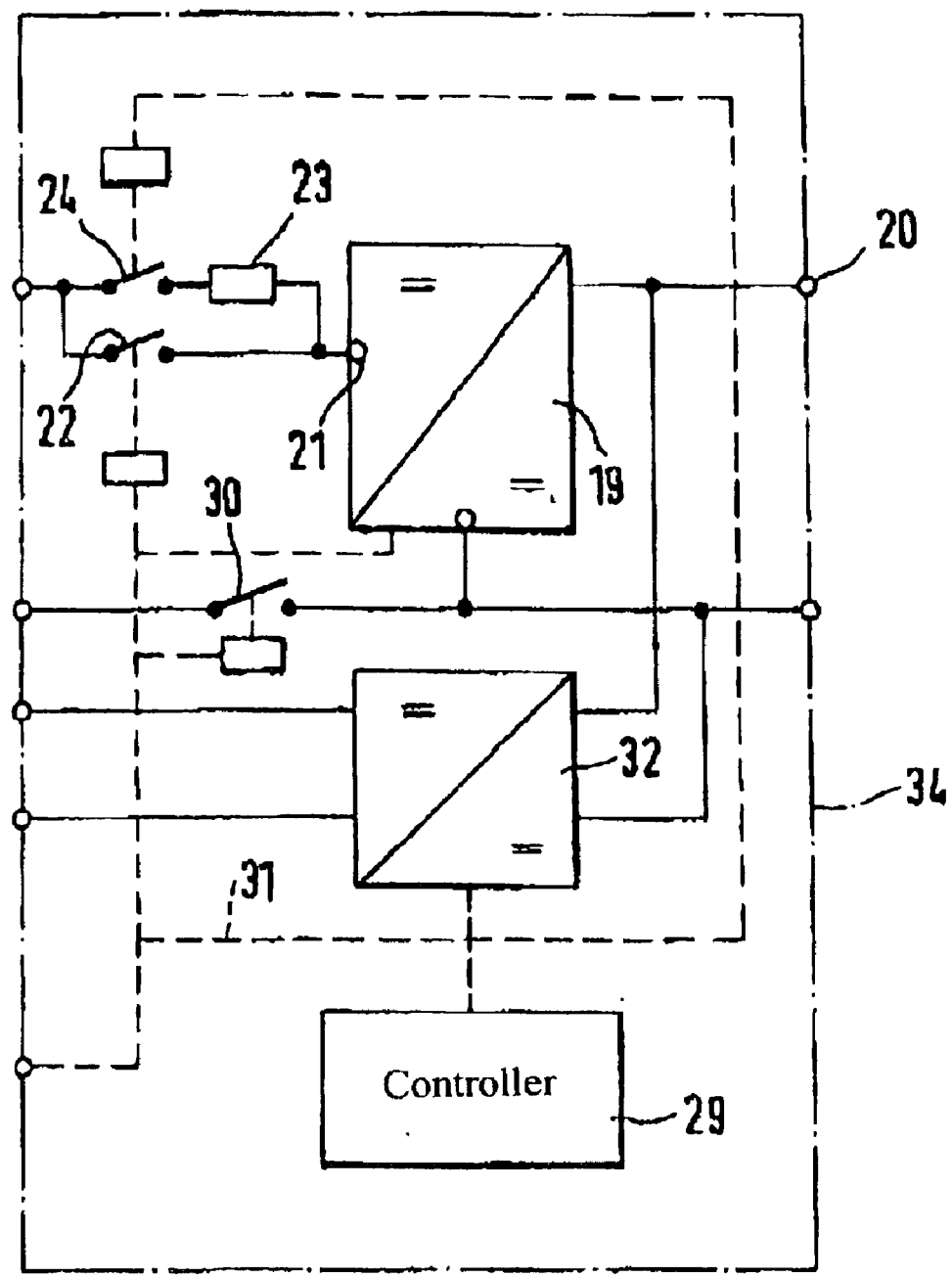
FIG. 2 shows part of a device for generating electrical power with a fuel cell and a temporary power store in a vehicle with d.c./d.c. converters which are arranged in a housing, and control components and switching components in a block circuit diagram.

As a result of the integrated d.c./d.c. converter a significant advantage in terms of weight, volume and design is obtained in comparison with two or more individual converters. FIG. 2 illustrates only the housing 34 with its components. Identical components in the device illustrated in FIGS. 1 and 2 are provided with the same reference numerals. The connection of the components illustrated in FIG. 2 in the interior of the housing to the other components is the same as in FIG. 1 and for this reason is not illustrated in FIG. 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for generating electrical power in a vehicle having a fuel cell, a drive motor, a driving converter and auxiliary or supplementary units for starting and continuous operation phases of the vehicle, said device comprising:

a first temporary power store;

at least one switching contact for connecting the auxiliary or supplementary units and a first end of a first bidirectional d.c./d.c. converter to electrical outputs of the fuel cell; and a controller which controls a release and direction of a power flux via the first d.c./d.c. converter as a function of an operating state of the fuel cell and of the first temporary power store; wherein, the drive motor is connectable to the fuel cell via the drive converter;

the driving converter is connected to electrical outputs of the fuel cell via a switching contact;

the first temporary power store is connectable to a second end of the first d.c./d.c. converter via at least one further switching contact;

a first end of at least one second bidirectional d.c./d.c. converter is connectable to electrical outputs of the fuel cell via the switching contact;

a second end of the second d.c./d.c. converter is connected to an onboard power system of the vehicle, whose voltage is lower than a rated voltage of the fuel cell, and which includes a second temporary power store;

the switching contact is arranged outside a connection path of the first temporary power store to the drive motor;

a release and direction of a power flux via the second d.c./d.c. converter is controlled by the controller as a function of the operating state of the fuel cell and of one of the first and second temporary power stores; and the release and direction of the power flux via the first d.c./d.c. converter is controlled by the controller as a function of an operating state of the second power store.

2. The device according to claim 1, further comprising a diode whose polarity is in the forward direction with respect to the polarity of the output current at rated operation of the fuel cell, which is arranged between at least one electrical output of the fuel cell and the switching contact.

3. The device according to claim 1, wherein:

the switching contact is arranged parallel to a series connection of a further switch and of a resistor, between a first electrical terminal of the first temporary power store and an input of the first d.c./d.c. converter; and the switches can be activated by means of the controller.

4. The device according to claim 1, wherein a switch which can be activated by the controller is arranged between a second electrical terminal of the first temporary power store and ground, to which in each case a terminal of the first d.c./d.c. converter and of the auxiliary drives as well as of the converter (3) is connected.

5. The device according to claim 1, wherein both electrical outputs of the fuel cell are connected via one switching contact each to the power system containing the converter, and the switching contacts can each be activated independently by the controller.

6. The device according to claim 1, wherein the first temporary power store is one of a lead acid battery, a nickel cadmium battery, a nickel metal hydride battery, a lithium ion battery and a lithium polymer battery.

7. The device according to claim 1, wherein the first temporary power store is one of a double-layer capacitor, a super capacitor and an ultra capacitor.

8. The device according to claim 1, further comprising sensors for measuring voltage and temperature of the first temporary power store, which sensors are connected to the controller as users on a bus.

9. The device according to claim 1, wherein a control and regulation program for operation of the fuel cell, the first and second d.c./d.c. converters, the auxiliary units and the temporary power store is stored in a non-volatile memory.

10. The device according to claim 1, wherein the first bidirectional d.c./d.c. converter and the second bidirectional d.c./d.c. converter are disposed in a common housing.

11. The device according to claim 10, wherein:

the switches are arranged between the first temporary power store and the d.c./d.c. converter; and the controller is arranged in the housing.

12. The device according to claim 10, wherein:

the first and second d.c./d.c. converters arranged in the housing and the controller are jointly connected to a supply voltage;

the first and second d.c./d.c. converters have a common coolant supply; and the housing has a communications interface with the bus.

13. A method for operating a device for generating electrical power in a vehicle which has a fuel cell; a controller; at least one drive motor which is connected via a driving converter to the fuel cell; auxiliary units for starting and subsequent continuous operation phases of the vehicle, the driving converter, the auxiliary and supplementary units and a first end of a bidirectional d.c./d.c. converter being connectable to electrical outputs of the fuel cell; and a temporary power store, which is connected to a controller and to a second end of the d.c./d.c. converter via at least one switch; said method comprising:

measuring fuel cell-end voltage and temporary power store-end voltage;

when the temporary power store is charged, predefining and monitoring a minimum fuel cell-end voltage value, a fuel cell-end setpoint current, a maximum temporary power store-end voltage value and a maximum temporary power store-end current;

when the minimum fuel cell-end voltage value or the maximum temporary power store-end voltage value or the fuel cell-end setpoint current or the power accumulator-end maximum current are reached, reducing the charge current of the d.c./d.c. converter so as to avoid undershooting the minimum voltage value, exceeding the maximum voltage value, and exceeding the setpoint current or the maximum current;

when the temporary power store is discharged, predefining and monitoring a maximum fuel cell-end voltage value, fuel cell-end setpoint current, a temporary power store-end minimum voltage value and a temporary power store-end maximum current value; and when the maximum fuel cell-end voltage value, the minimum temporary power store-end voltage value or the setpoint current or the power accumulator-end maximum current value is reached, the d.c./d.c. converter reducing the discharge current of the temporary power store such that the maximum voltage value is not exceeded, the minimum voltage value is not undershot, and the setpoint current and the maximum current are not exceeded.

14. The method according to claim 13, further comprising:

when one of the minimum fuel cell-end voltage value and a predefined high voltage value is reached or undershot, setting the d.c./d.c. converter to a discharge mode in which the current is fed into a power system connected to the fuel cell;

when one of the maximum fuel cell-end voltage value and a predefined lower voltage value is reached or exceeded, setting the d.c./d.c. converter to a charge mode in which current from the power system connected to the fuel cell is fed into the temporary power store; and the d.c./d.c. converter being inactive when the voltage of the fuel cell lies between the minimum voltage value and the maximum predefined voltage value.

15. The method according to claim 13, wherein:

to start the fuel cell, the temporary power store is first connected, by closing the switch, to the d.c./d.c. converter which makes available the power for the auxiliary or supplementary units that are connected to the power system connected to its output;

the fuel cell is activated by the auxiliary or supplementary units; and after the predefined output voltage of the fuel cell has been reached, a switch upstream of the output of the fuel cell is closed.

* * * * *